Patented Apr. 29, 1941

2,240,323

UNITED STATES PATENT OFFICE 2,240,323

SOUND MOTION PICTURE APPARATUS

Arthur G. Zimmerman, Indianapolis, Ind., assignor to Radio Corporation of America, a corporation of Delaware Application November 30, 1939, Serial No. 306,835

4 Claims. (Cl. 88—16.2)

This invention relates to an improved motion picture apparatus and, more particularly, to an improved means for mounting a picture head on a sound head with the gears thereof in properly adjusted relation.

In the construction of sound motion picture apparatus, it is customary to provide separate devices for the projection of the pictures and for the reproduction of the sound. Ordinarily, the sound head is tiltedly mounted on a base and has combined with it an appropriate drive motor. The picture projector is usually mounted on top of the sound head and is firmly secured thereto. A gear of an appropriate train on the side of the picture projector meshes with an appropriate gear on the side of the sound head which is connected to the drive motor, and the two devices are thus maintained in synchronism. The film passes from the upper magazine down through the picture projector and then into the sound head from which it passes to the lower or takeup magazine, and it is accordingly necessary that the projector and the sound head be secured in accurate alignment to prevent weave of the film.

It was heretofore customary to bolt or screw the projector directly to the top of the sound head and it was possible in that arrangement to secure the devices rigidly together and in accurate alignment, but much time was wasted in the process and many special tools were required, both for aligning the elements and for securing them together after they were in alignment.

In the apparatus of the present invention, a member is provided which can be accurately secured to the picture projector and which can thereafter be loosely secured to the sound head in accurate alignment. This member is provided with adjusting means so that, after the picture projector and member are placed on the soundhead in proper alignment, the apparatus may be adjusted to provide proper meshing of the gears without disturbing the alignment of the elements, and the whole may then be rigidly secured together.

One object of the invention is to provide an improved mechanism for accurately aligning a picture projector and a sound head.

Another object of the invention is to provide a means for alignment and securing together of a picture projector and sound head and for thereafter providing relative adjustment of the elements without disturbing the alignment.

Another object of the invention is to provide a means which may be rigidly secured to a picture projector and adjustably secured to a sound head so as to secure the picture projector and sound head together in accurately adjusted position.

Another object of the invention is to provide a device of the class described which will serve to catch any oil which may leak from the picture projector and trap it before it has opportunity to enter the sound head.

Other and incidental objects will be apparent to those skilled in the art from a reading of the following specifications and an inspection of the accompanying drawing, in which Figure 1 is a top view of my adjusting device in position on top of a commercial type of sound head, and Figure 2 is a side view of the device showing its relation to both the sound head and a standard type of picture projector.

The sound head indicated in the drawing at 10 is a commercial type of RCA photophone soundhead and is of the same general nature as that shown in Loomis et al., Patent 2,019,147, issued October 29, 1935. The motion picture projector shown at 12 is indicated in its relation to the mounting plate 11 as being a commercial Simplex projector although the mounting plate can be used as well for other types of projectors.

The mounting plate 11 is preferably made of cast iron and is secured firmly to the projector 12 by the screws 15 and 16 which fit into threaded holes in the bottom of the projector. The projector 12 is provided with a gear 14 which meshes with the gear 13 on the sound head which latter gear is driven by the sound head motor not shown.

The mounting plate 11 is provided with pins 17 and 18 which are pressed or driven in appropriate holes through plate 11 and are secured therein, for example, by staking. These pins 17 and 18 are of such diameter as to slide in the slots 19 and 20 cut in the top of the sound head and to thereby maintain the plate 11 in proper alignment with the sound head. Although the slots 19 and 20 are shown as rectangular slots cut completely through the top of the sound head, it will be apparent that they need not be cut completely through and may be curved at the end, as for example, with slots formed by a circular cutter.

Longitudinal adjustment of the plate 11 relative to the sound head 10 is accomplished by the hexagon head eccentric 21. This member 21 passes through a hole in the plate 11 and is secured by a snap ring 22. The circular portion 23 which is eccentrically located in proportion to the rest of the member is movable laterally in the slot 24 cut traversely in the sound head.

It will be apparent that rotation of the head of the member 21 will cause movement of the plate 11 to the right or left in the drawing and the amount of this movement can be very accurately controlled. No twisting movement of the plate and projector is possible due to the pins 17 and 18 operating in their slots. After the device is assembled, the member 21 is adjusted until the gears 13 and 14 are in proper mesh. The plate 11 can be rigidly secured to the sound head 10 by the cap screws 25, 26, 27 and 28 which fit in holes enough larger than their own diameter to permit the necessary adjustment by the eccentric 23. Each of these cap screws is provided with an appropriately large washer 29 in order that they may cooperate with the material surrounding the large holes.

The top of the plate 11 has a depressed area between the lines 30 and 31 which serves to collect any oil tending to drip from the picture projector toward the sound head. The oil collecting in this area may be readily wiped out or may be withdrawn through an appropriate drain tube installed in either one end or the other of the depressed area depending on which direction the projector is tilted. The area within the line 31 is machined to a flat surface in order to properly cooperate with the bottom of the projector 12.

It will be apparent from the foregoing description that the member 11 with its associated elements provides an appropriate means for the relative positions of the sound head and projector and at the same time maintains them in proper alignment and serves to secure them firmly together.

Having now described my invention, I claim:

1. Apparatus for securing a sound head and picture projector together comprising a member adapted to fit between the projector and sound head, means for securing the projector rigidly to said member, means for maintaining the member in alignment with the sound head, means for adjusting the member longitudinally in relation to the sound head and means for rigidly securing the member to the sound head.

2. Apparatus for securing a sound head and picture projector together comprising a plate adapted to fit between the projector and sound head, means for securing the projector rigidly to said plate, cooperating means on the plate and sound head for maintaining the plate in alignment with the sound head, means for adjusting the plate longitudinally in relation to the sound head and means for rigidly securing the plate to the sound head.

3. Apparatus for securing a sound head and picture projector together comprising a plate adapted to fit between the projector and sound head, means for securing the projector rigidly to said plate, means on said plate engaging the sound head for maintaining the plate in alignment with the sound head, means on said plate engaging the sound head for adjusting the plate longitudinally in relation to the sound head and means for rigidly securing the plate to the sound head.

4. Apparatus for securing a sound head and picture projector together comprising a plate adapted to fit between the projector and sound head, means for securing the projector rigidly to said plate, means on said plate engaging slots in said sound head for maintaining the plate in alignment with the sound head, eccentric means engaging a slot in said sound head for adjusting the plate longitudinally in relation to the sound head and means for rigidly securing the plate to the sound head.

ARTHUR G. ZIMMERMAN.

DISCLAIMER 2,240,323.—*Arthur G. Zimmerman*, Indianapolis, Ind. SOUND MOTION PICTURE APPARATUS. Patent dated April 29, 1941. Disclaimer filed January 17, 1942, by the assignee, *Radio Corporation of America*.

Hereby enters this disclaimer to claims 1 and 2.

[*Official Gazette February 17, 1942.*]